US009958089B2

United States Patent
Geiger et al.

(10) Patent No.: US 9,958,089 B2
(45) Date of Patent: May 1, 2018

(54) LASHING SUPPORT SPACER TIE

(71) Applicant: HellermannTyton Corporation, Milwaukee, WI (US)

(72) Inventors: Gerard G. Geiger, Jackson, WI (US); Walter Patrick Trautfield, Milwaukee, WI (US)

(73) Assignee: HELLERMANNTYTON CORPORATION, Milwaukee, WI (US)

( * ) Notice: Subject to any disclaimer, the term of this patent is extended or adjusted under 35 U.S.C. 154(b) by 0 days. days.

(21) Appl. No.: 14/869,696

(22) Filed: Sep. 29, 2015

(65) Prior Publication Data

US 2016/0091122 A1     Mar. 31, 2016

Related U.S. Application Data (60) Provisional application No. 62/056,807, filed on Sep. 29, 2014.

(51) Int. Cl.
*F16L 3/22*    (2006.01)
*F16L 3/137*   (2006.01)
*F16L 3/237*   (2006.01)

(52) U.S. Cl.
CPC ........ *F16L 3/137* (2013.01); *F16L 3/22* (2013.01); *F16L 3/237* (2013.01)

(58) Field of Classification Search
CPC ........ B62J 11/00; B65D 63/1027; B65D 2563/108; B65D 3/10; F16B 2/08; B62M 25/00; B62M 25/02; F16L 3/22; F16L 3/237; F16L 3/10

USPC ........ 248/61, 65, 68.1, 71, 74.1, 74.3; 24/16 PB

See application file for complete search history.

(56) References Cited

U.S. PATENT DOCUMENTS

| 3,257,694 | A |   | 6/1966 | Litwin |
|-----------|---|---|--------|--------|
| 3,463,427 | A |   | 8/1969 | Fisher |
| 3,654,669 | A | * | 4/1972 | Fulton .......... B65D 63/14 24/16 PB |
| 3,747,164 | A |   | 7/1973 | Fortsch |
| 3,816,878 | A |   | 6/1974 | Fulton |

(Continued)

OTHER PUBLICATIONS

Thomas & Betts, Deltec Cable Tie, http://www-public.tnb.com/ps/fulltilt/index.cgi?check=Y&part=TYD5135M, dated Jul. 23, 2013, 2 pages.

(Continued)

*Primary Examiner* — Muhammad Ijaz
(74) *Attorney, Agent, or Firm* — Robert J. Myers (57) ABSTRACT

A one-piece lashing support spacer tie for securing two elongate articles or bundles in a parallel, spaced apart relationship is provided with a strap flexibly coupled to a head. The head is provided with a plurality of strap slots and passages through which to receive the strap. One of the strap passages mechanically engages the strap to prevent movement of the strap in at least one direction when in use, such as with a pawl physically engaging one or more serrations or teeth provided on the strap. The other strap slot may mechanically engage the strap in a similar manner, or the other slot may be provided with structure to establish one or more slidable, frictional engagements with the strap when it is inserted therethrough.

24 Claims, 9 Drawing Sheets

(56) References Cited

U.S. PATENT DOCUMENTS

| | | | | |
|---|---|---|---|---|
| 3,981,048 A * | | 9/1976 | Moody | F16L 3/233 24/16 PB |
| 4,001,898 A | | 1/1977 | Caveney | |
| 4,191,334 A | | 3/1980 | Bulanda | |
| 4,272,870 A | | 6/1981 | McCormick | |
| 4,287,644 A | | 9/1981 | Durand | |
| 4,347,648 A | | 9/1982 | Dekkers | |
| 4,397,435 A * | | 8/1983 | Fisher | F16L 3/00 24/21 |
| D273,361 S | | 4/1984 | Suzuki | |
| RE31,689 E | | 10/1984 | Bulanda | |
| 4,498,507 A | | 2/1985 | Thompson | |
| D281,301 S | | 11/1985 | Spolar | |
| 4,557,023 A | | 12/1985 | Six | |
| 4,562,982 A | | 1/1986 | McSherry | |
| 4,574,434 A | | 3/1986 | Shupe | |
| 4,665,588 A | | 5/1987 | Nakano | |
| 4,754,529 A | | 7/1988 | Paradis | |
| 4,788,751 A | | 12/1988 | Shely | |
| 4,819,897 A | | 4/1989 | Gooding | |
| 4,860,979 A | | 8/1989 | Camenisch | |
| D305,099 S | | 12/1989 | Naruse et al. | |
| D305,977 S | | 2/1990 | Ono | |
| 4,909,051 A * | | 3/1990 | Lee | E05B 75/00 128/878 |
| 4,993,669 A | | 2/1991 | Dyer | |
| 5,083,346 A | | 1/1992 | Orton | |
| 5,088,158 A | | 2/1992 | Burkholder | |
| 5,102,075 A | | 4/1992 | Dyer | |
| 5,117,575 A | | 6/1992 | Desmond | |
| 5,131,613 A | | 7/1992 | Kamiya et al. | |
| D334,337 S | | 3/1993 | Ito et al. | |
| 5,267,967 A * | | 12/1993 | Schneider | A61M 25/02 128/DIG. 6 |
| D347,156 S | | 5/1994 | Starrett | |
| 5,377,387 A | | 1/1995 | Freed | |
| 5,398,383 A | | 3/1995 | Bingold | |
| 5,416,955 A | | 5/1995 | Katsma | |
| D363,212 S | | 10/1995 | Hill | |
| D368,853 S | | 4/1996 | Liu et al. | |
| 5,538,208 A | | 7/1996 | Cordes | |
| 5,584,452 A | | 12/1996 | Kolke | |
| 5,628,348 A | | 5/1997 | Scott | |
| 5,836,053 A | | 11/1998 | Davigon | |
| 5,884,367 A | | 3/1999 | Teagno et al. | |
| 5,911,368 A | | 6/1999 | Davignon | |
| 5,924,171 A * | | 7/1999 | Sorensen | B65D 63/1063 24/16 PB |
| 5,954,302 A | | 9/1999 | Robertson | |
| 5,956,813 A | | 9/1999 | Cooper | |
| 5,966,781 A | | 10/1999 | Geiger | |
| D417,387 S | | 12/1999 | Kim | |
| D417,838 S | | 12/1999 | Kim | |
| D424,923 S | | 5/2000 | Lodi | |
| 6,079,657 A | | 6/2000 | Hwang | |
| 6,105,210 A | | 8/2000 | Benoit | |
| 6,105,908 A | | 8/2000 | Kraus | |
| 6,119,314 A | | 9/2000 | Freed | |
| 6,129,317 A * | | 10/2000 | Rodrigues | F16L 3/137 248/49 |
| 6,151,761 A | | 11/2000 | Thompson | |
| D435,438 S | | 12/2000 | West | |
| 6,196,033 B1 | | 3/2001 | Dowdle | |
| D442,851 S | | 5/2001 | Wilson | |
| 6,240,602 B1 | | 6/2001 | Geiger | |
| 6,330,989 B1 | | 12/2001 | Okamoto | |
| 6,363,244 B1 | | 3/2002 | McGhee | |
| 6,364,257 B1 | | 4/2002 | Holder | |
| 6,430,783 B1 | | 8/2002 | Benoit | |
| 6,484,366 B1 | | 11/2002 | Deschenes | |
| 6,497,258 B1 | | 12/2002 | Flannery | |
| 6,532,631 B2 | | 3/2003 | Rohaly | |
| 6,828,509 B2 | | 12/2004 | Ito et al. | |
| D530,600 S | | 10/2006 | Krisel | |
| 7,131,168 B2 * | | 11/2006 | Pangallo | B65D 63/1063 24/16 PB |
| D537,333 S | | 2/2007 | Jowsey | |
| 7,229,052 B2 | | 6/2007 | Takeuchi | |
| 7,316,375 B2 | | 1/2008 | Wakabayashi | |
| 7,334,299 B2 | | 2/2008 | Assarsson | |
| D565,401 S | | 4/2008 | Grady et al. | |
| D570,673 S | | 6/2008 | Geiger et al. | |
| 7,661,633 B2 | | 2/2010 | Igarashi | |
| D614,941 S | | 5/2010 | Murphy | |
| D619,887 S | | 7/2010 | Colton | |
| 7,753,320 B2 | | 7/2010 | Geiger et al. | |
| 7,753,321 B2 | | 7/2010 | Geiger | |
| 7,774,905 B2 * | | 8/2010 | Geiger | F16L 3/2332 24/16 PB |
| 7,775,484 B2 | | 8/2010 | Gunzburger | |
| 7,789,414 B2 | | 9/2010 | Blackburn | |
| D631,731 S | | 2/2011 | Chen | |
| D634,187 S | | 3/2011 | Kozel | |
| 8,033,966 B2 | | 10/2011 | Ayoub | |
| 8,282,047 B2 | | 10/2012 | Franks | |
| D670,154 S | | 11/2012 | Kelleghan | |
| 8,474,104 B2 | | 7/2013 | Watson | |
| 8,559,782 B2 | | 10/2013 | Cleofe et al. | |
| D698,632 S | | 2/2014 | Wang | |
| D700,826 S | | 3/2014 | Qin | |
| 8,739,387 B1 | | 6/2014 | Frishberg | |
| 8,978,210 B2 | | 3/2015 | Arjomand | |
| 8,978,211 B2 | | 3/2015 | Arjomand | |
| D728,351 S | | 5/2015 | Martinson | |
| D728,352 S | | 5/2015 | Martinson | |
| 9,067,717 B2 | | 6/2015 | DeMik | |
| D741,691 S | | 10/2015 | Adams | |
| D741,701 S | | 10/2015 | McNeil | |
| D749,409 S | | 2/2016 | Martinson | |
| D751,888 S | | 3/2016 | Sakamoto | |
| D769,704 S | | 10/2016 | Nitta | |
| 2003/0106190 A1 | | 6/2003 | Christianson | |
| 2006/0265840 A1 | | 11/2006 | Thompson | |
| 2007/0057124 A1 | | 3/2007 | Kwilosz | |
| 2008/0185409 A1 | | 8/2008 | Kellenberger | |
| 2009/0276983 A1 | | 11/2009 | Chan | |
| 2010/0071169 A1 | | 3/2010 | Williams et al. | |
| 2010/0096511 A1 | | 4/2010 | Olver | |
| 2010/0236030 A1 * | | 9/2010 | Dyer | B65D 63/1063 24/16 PB |
| 2010/0306967 A1 | | 12/2010 | Geiger | |
| 2012/0291231 A1 | | 11/2012 | Ku | |
| 2015/0033509 A1 | | 2/2015 | Dietrich | |
| 2015/0210453 A1 | | 7/2015 | Liang | |
| 2016/0009469 A1 | | 1/2016 | Schneider De Oliveira | |

OTHER PUBLICATIONS

Panduit, Aerial Support Ties, www.panduit.com/wcs/Satellilte?c=Page&childpagename=Panduit_Global%2FPG_Layout&cid=1345565612156&packedargs=classification_id%3D199, Jul. 23, 2013.

Panduit product page, Aerial Support Ties, www.panduit.com/heiler/CatalogCutSheets/AST10-5-C100%20Product%20Page.pdf, date unknown, 1 page.

Panduit product page, Sta-Strap Bow-Ty Cable Ties, http://www.panduit.com/heiler/CatalogCutSheets/SSB2S-C%20Product%20Page.pdf, date unknown, 1 page.

HellermannTyton Catalog page, http://wpc.ac62.edgecastcdn.net/00AC62/documents/catalogs/LITPDCMIS_US_CAT.pdf, p. 66, date unknown, 1 page.

* cited by examiner

LASHING SUPPORT SPACER TIE

RELATED APPLICATION

This application claims the benefit of U.S. Provisional Patent Application Ser. No. 62/056,807, filed 29 Sep. 2014.

BACKGROUND OF THE INVENTION

The present invention relates generally to lashing support spacer tie devices. Such devices secure two elongate articles or bundles in a parallel, spaced apart relationship. The invention relates more specifically to systems and methods for securing a co-axial cable to an elongate support structure such as an aerial support cable in overhead locations.

Often times it is desirable to support a single wire, a bundle of wires, co-axial cable, or other elongate items by an offset distance from a suspended aerial support cable. See FIGS. 1 through 5 which depict the installation and securement of a coaxial cable to an aerial support cable.

Figures 26, 27:
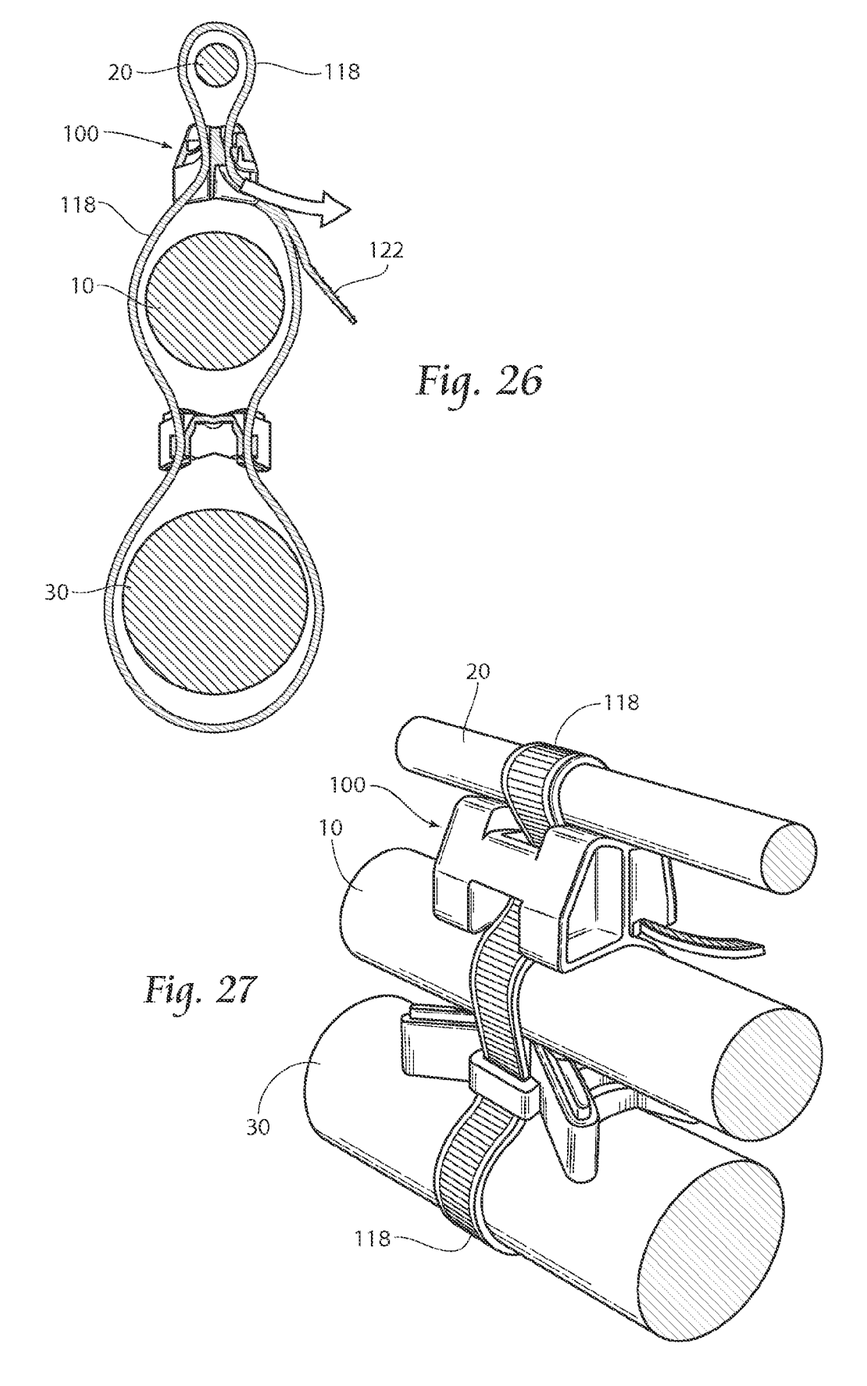
FIG. 26 is a cross-sectional view showing the tie strap positioned loosely about three bundles or cables.
FIG. 27 is a perspective view of the embodiment of FIG. 6 or FIG. 16 in a third encircled bundle position including first, second and third elongate bundles.

Some prior systems for performing this function are known to provide a plurality of separate and discrete stackable saddle spacers. See, for example FIGS. 1 and 8 in U.S. Pat. No. 4,562,982 (McSherry, et al.). These spacers positioned between the coaxial cable and aerial support cable and provide an offset spacing from the aerial support cable using a conventional metal or plastic cable tie, bundle tie, or zip tie. There are disadvantages of the prior art separate stackable saddle spacers including complicated assembly installation onsite in a telescoping boom bucket aerial lift truck. Multiple components must be threaded together with a cable tie surrounding two loosely spaced heavy cables, shown in FIG. 26, while holding the stackable saddle spacers against and in alignment with the cables. The cable tie is then tightened in order to compress the bundle while maintaining the alignment of the separate spacers and cable tie. In addition, installers are required to purchase and maintain an inventory of stackable saddle spacers and cable ties, and have available each component, for assembly, in the boom bucket of the aerial lift truck.

Another prior device shown in U.S. Pat. No. 3,654,669 (Fulton) includes a spacer and cable tie molded separately, whereby the cable tie is preassembled to the spacer by the manufacturer to provide an easier-to-use sub-assembly for the installation; however, some limitations exist. To determine the direction of inserting the strap into the locking frame to create loops around the bundles, the installer must locate published directions, and read and follow the prescribed procedure (or use trial and error until the correct assembly method is accomplished).

This and other prior art devices have other shortcomings including the tail of the strap is difficult to grasp and pull through the spacer, with a thumb and forefinger, because the strap tail contains all smooth surfaces. This becomes increasingly more difficult when larger bundle diameters are attempted to be secured (when there is not much excess strap to grasp). If attempted to be used in overhead aerial co-axial cable support applications (as depicted in FIG. 1 through FIG. 5 herein) and to tension the encircled cables, this device requires the installer to pull the tail of the strap in an upward direction which is much more difficult compared to pulling downward. Additionally, the spacer design does not provide a cradle or saddle surface for the bundles to nest or reside in resulting in a loose separation between bundles, shown in FIG. 5 and FIG. 6 in U.S. Pat. No. 3,654,669 (Fulton), which allows the bundles to pivot at each installed device and further the bundles can "snake" (twist & turn) out of alignment with respect to each other in between each installed device.

Further, another prior art device is shown in U.S. Pat. No. RE31,689 (Bulanda et al.). This cable tie is a single molded component containing an integrally molded spacer with a locking pawl; however, many limitations exist. In overhead aerial co-axial cable installations (as again depicted in FIG. 1 through FIG. 5 herein) to tension the encircled cables, this device requires the installer to pull the tail of the elongated strap in an upward direction which is more difficult compared to pulling downward. The advantage to pulling downward is the installer uses his or her body weight (and gravity) to secure the cables. This device further requires a pliers tool, (see FIG. 6C of U.S. Pat. No. RE31,689) to obtain leverage for final tensioning. Tensioning and cutting off excess strap length with a common cable tie tension and cutoff tool is not possible with the protruding teeth on the device's strap. The large teeth on the outside of the strap contain geometry that may contribute to critical stress which cause stress whitening when the strap is flexed adjacent to the large teeth. Further, the large teeth on the outside of the strap limit/restrict the use of this device with the aforementioned prior art stackable saddle spacers because the large teeth tend to jam against interior edges of stackable saddle spacers. Also, the large teeth on the outside of the strap snag and get caught on adjacent components and passages when using this device on harnesses whereby the harnesses are routed and pulled through equipment, automobile chassis, appliances, aircraft fuselage, etc. The first bundle to be secured is limited to a small bundle diameter due to the small narrow edges of the pair of leg members and the location of the strap attachment to the spacer. This device design does not contain an end wall for reinforcement and there is no broad supporting saddle surface on either side of the spacer that contacts the secured cables or bundles; this structurally limits reinforcement strength of the spacer for use in bundle-to-spacer-to-bundle (sandwich) compression applications. The elongated strap cross section profile does not provide enough surface area to allow long lengths of plastic resin to flow though; therefore, the device is limited to short strap lengths which limits both of the bundle diameter sizes that are attempted to be secured.

SUMMARY OF THE INVENTION

The present invention solves all the aforementioned issues. The lashing support spacer tie provides permanently engraved assembly instructions adjacent each passage opening in the head guiding the installer where to insert the elongated strap into the head and the order for inserting the strap to provide the first bundle loop and second bundle loop. The tail of the strap is easy to grasp and pull through the head, with a thumb and forefinger, because the strap tail contains conical protrusions on both sides of the tail end which provide a highly frictional engagement while grasping between the thumb and forefinger. This is especially beneficial when larger bundle diameters are being secured (when there is not much excess strap to grasp). For overhead aerial co-axial cable installations, as depicted in FIG. 1 through FIG. 5 herein, to tension the encircled bundles, this device allows the installer to pull the tail of the strap in a downward direction. This allows the installer to use his or her body weight (and gravity) to lower repetitive physical energy/effort. This device includes an optional friction tab that engages the elongated strap after the first bundle is circumferentially wrapped and passed into the head which frees up the installer's hands after circumferentially looping the strap around the first bundle. The length of the friction tab is adjusted to allow the strap to be withdrawn or released by applying a higher extraction force on the strap; this enables the installer to add more wires, cables, or other elongate items to the first bundle during assembly. The head design provides opposing "V" shaped saddle surfaces for the elongate articles or bundles of articles to nest or reside in when the strap is tensioned around the encircled bundles. The saddle surfaces also align the bundles with each installed device. This device can be installed by hand and further precisely tensioned and excess strap cutoff with a common cable tie tension & cutoff tool. The exterior strap surface is substantially flush with non-protruding teeth thereby introducing no critical stresses into the elongated strap. Further, since the overall strap surface is substantially flush with non-protruding teeth on the exterior, there are no protruding teeth to catch or snag on adjacent components or in passages. This device is capable of securing a large range (from 0.25 inch to 4.50 inch combined diameters for both bundles) of bundle diameters on either side of the substantially "V" shaped saddle surfaces. Each of the first and second opposing saddle surfaces provides high compressive strength with its broad bundle contact surfaces and "I" beam internal reinforcement. The elongated strap cross section profile is conducive to allowing long lengths of plastic resin to flow though the manufacturing mold; therefore, the device is available in long strap lengths which thereby enable securing larger bundle diameter sizes. Also since the overall strap surface is flush with non-protruding teeth, this invention allows the addition of stackable saddle spacers to add more bundles in the aligned spacing arrangement or increased spacing of the bundles. The assembly strength of this device is 120 lbs which is sufficient strength for aerial co-axial cable support applications subjected to weather extremes. Likewise the 120 lbs assembly strength of this device is suitable for use on heavy harnesses whereby the harnesses are routed and pulled through equipment, automobile chassis, appliances, aircraft fuselage, etc. The major advantage of this invention is that this device is a single injection molded component that does not require the additional time and cost of sub-assembly and provides all the aforementioned performance attributes.

In addition the present invention is not limited to securing co-axial cable to aerial support cables. Other applications may be accommodated such as securing and separating parallel bundles for the purpose of electrical separation to prevent cross conduction in copper wiring, securing and separating electrical wires from grounded plumbing lines, separation for static noise or interference reduction for routing wires to-and-from electronic equipment, thermal separation in air conditioning Freon lines from high temp water hoses, securing and separating a bundle running parallel to a rod like support, and in the horticulture industry, securing and separating a young transplanted tree to a support post.

Embodiments according to the present invention provide for an improved component, manufacturing process, procurement, distribution, replacement, and installation assembly method related to securing and spacing a bundle to another bundle or an elongate support structure.

An elongate lashing support spacer tie is provided with a strap flexibly coupled to a saddle spacer head. The saddle spacer head is provided with a plurality of strap passages or slots through which to receive the strap. At least one of the strap slots mechanically engages the strap to prevent movement of the strap in at least one direction when in use, such as with a pawl physically engaging one or more serrations or teeth provided on the strap. The other strap slot may mechanically engage the strap in a similar manner, or the other slot may be provided with structure to establish one or more slidable, frictional engagements with the strap when it is inserted therethrough. The head is provided with top and bottom saddle surfaces having transverse valleys, preferably defined by an angular intersection of at least two substantially planar wall sections. While the angular intersection of the top and bottom valleys may be substantially similar or identical, the depths of the valleys may be different, such as the top being shallower than the bottom, to help accommodate elongate articles of different diameters.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention.

Turning now to the figures, FIG. 6 through FIG. 15, shows a first embodiment of a cable tie 100 according to the present invention. The tie 100 extends from a first end 102 to a second end 104, and includes a strap 110 and a spacer head 150, which are preferably formed as a unitary member. The strap 110 extends from the first end 102 towards the spacer head 150, and may be formed as a generally substantially planar strap along a strap length 112 and having a strap width 114. The strap 110 preferably has a gripping portion 116 and a securing portion 118. The gripping portion 116 extends from the first end 102 along a gripper length 116*a* towards the securing portion 118 having a first strap thickness 120. The gripping portion 116 preferably includes a gripping tab 122 disposed at the first end 102, the tab 122 being preferably having the first strap thickness 120 and extending from the remainder of the gripping portion 116 at an angle 124 of between about thirty degrees to about sixty degrees, and more preferably about forty-five degrees. The gripping portion 116 preferably includes at least one, but preferably a plurality of gripping elements 126 disposed on at least one of a top surface 116*b* and a bottom surface 116*c* of the gripping portion 116. The gripping elements 126 may be formed as conical or domed projections, preferably of the same material as the gripping portion 116.

The securing portion 118 of the strap 110 is preferably disposed along the strap 110 and between the gripping portion 116 and the spacer head 150. The securing portion 118 extends along a length 118*a*, from the gripping portion 116 towards the spacer head 150. The securing portion 118 generally includes a top surface 118*b* and a bottom surface 118*c*, separated by a maximum thickness 118*d*. The maximum thickness 118*d* is preferably provided at least along longitudinal edges of the securing portion 118, such as along parallel rails 128. Disposed preferably at least substantially perpendicular to and between the securing rails 128 is at least one, but more preferably a plurality of, an engagement teeth or serrations 129. Each engagement tooth 129 is preferably provided with a sloped leading edge 129*a* and a trailing edge 129*b*, which is substantially perpendicular to the securing portion length 118*a*.

As indicated, the strap 110 is preferably coupled to the spacer head 150. While a variety of coupling arrangements are possible, a preferred coupling member includes a yoke 130, extending between and coupling the strap 110 and the spacer head 150. The yoke 130 preferably includes a first yoke arm 132 and a second yoke arm 134 coupled to the strap 110, generally in a "Y" or "V" formation. The yoke 130 extends along a yoke length 130*a*, measured parallel to a longitudinal orientation of the strap 110, and is provided with a top surface 130*b* and a bottom surface 130*c* separated by a yoke thickness 130*d*. The yoke thickness 130*d* may be substantially uniform throughout the yoke shape, but preferably the yoke 130 has an area of reduced thickness or web 136 disposed between the first yoke arm 132 and the second yoke arm 134. This area of reduced thickness or web 136 is preferably not attached to the spacer head 150.

Turning now to the spacer head 150 that is coupled to the strap 110, the spacer head 150 generally includes a plurality of head sidewalls, which are preferably of at least substantially similar thickness T which helps during the manufacturing process. The sidewall thickness T may be substantially similar or identical to the maximum strap thickness 118*d*. The head 150 extends along a head height. 151 measured perpendicular to the head medial plane 164. The plurality of sidewalls includes a front sidewall 152, a rear sidewall 154, a bottom sidewall 156 and a top sidewall 158. All four of the sidewalls preferably scan a head width 160 between lateral head sides 162L and 162R disposed preferably perpendicular to a head medial plane 164. The front sidewall 152 is disposed closest to the strap 110, and includes a first substantially planar front surface 152*a*, preferably parallel to the head medial plane 164 and perpendicular to the strap 110 during forming, and a second substantially planar front surface 152*b* extending angularly from the first surface 152*a* towards the top sidewall 158 and sloped towards the head medial plane 164. The first front surface 152*a* is preferably spaced from and not connected to the strap 110, the yoke 130, or the bottom sidewall 156. Rather, the first surface 152*a* is preferably provided with a flexion gap 166 which allows the yoke arms 132 and 134 and/or the bottom sidewall 156 to flex with respect to the spacer head 150.

The rear sidewall 154 is disposed furthest from the strap 110 and preferably forms the second end 104 of the device 100. The rear sidewall 154 includes a first substantially planar rear surface 154*a*, preferably parallel to the head medial plane 164 and perpendicular to the strap 110 during forming, and a second substantially planar rear surface 154*b* extending angularly from the first surface 154*a* towards the top sidewall 158 and sloped towards the head medial plane 164.

The bottom sidewall 156 scans a bottom head length 168, preferably as an extension of the yoke 130. The bottom sidewall 156 may be provided as a first bottom sidewall 156L and a second bottom sidewall 156R, which have coplanar wall sections 156*a,b*. The first wall section 156*a* extends from the second end 104 towards the head medial plane 164, and the second wall section 156*b* extends from the first section 156*a* towards the yoke 130 and is preferably integrally formed as an extension of each yoke arm 132,134. A reinforcement rib 156*c* may be coupled between and formed integrally with two or more of the sections 156*a,b*. The first sections 156*a* are preferably provided with an extension of the flexion gap 166 provided through the first front sidewall surface 152*a*. Each first section 156*a* is preferably disposed in an angular arrangement with respect to a second section 156*b* at an obtuse angle 156*d* of less than 180 degrees.

The top sidewall 158 spans a top head length 169, preferably centered over the head medial plane 164. The top sidewall 158 may be provided as a first top sidewall 158L and a second top sidewall 158R, which have coplanar wall sections 158*a,b*. The first wall section 158*a* extends from the rear sidewall 154 towards the head medial plane 164, and the second wall section 158*b* extends from the first section 158*a* towards the front sidewall 152. A reinforcement rib 158*c* may be coupled between and formed integrally with two or more of the sections 158*a,b*. Each first section 158*a* is preferably disposed in an angular arrangement with respect to a second section 158*b* at an obtuse angle 158*d* of less than 180 degrees. In this embodiment, the angle 156*d* formed by the bottom sidewall 156 and the angle 158*d* formed by the top sidewall 158 are substantially similar or identical, whereas the top head length 169 is shorter than the bottom head length 168.

Generally, the head 150 is adapted to receive the strap 110 through one or more strap slots. Preferably provided are two slots, a rear strap slot 170 and a front strap slot 172. The rear strap slot 170 extends through the head 150 between the head medial plane 164 and the rear sidewall 154, through a bottom opening 170*a* formed through the rear sidewall 154 and/or the bottom sidewall 156, and a top opening 170*b* formed through the rear sidewall 154 and/or the top sidewall 158. In this embodiment, the rear strap slot 170 preferably provides one or more frictional engagements with a strap 110 inserted therethrough. A first frictional engagement may be provided by at least one contact point. A contact point is provided by an edge of the reinforcement rib 158*c* at or near a top surface of the top sidewall 158, the second contact point to slidably receive the preferably smooth bottom surface 118*c* of the strap 118.

Figure 12:
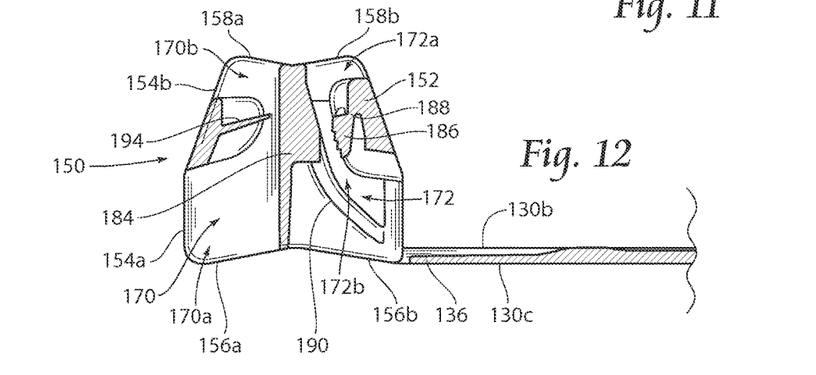
FIG. 12 is a cross-sectional view taken along line 12-12 of FIG. 8.

Regarding the mechanical engagement member in the rear strap slot 170, a pawl member 194 extends into the slot 170 towards the head medial plane 164, depending from the rear sidewall 154. The pawl member 194 is adapted to engage one or more of the teeth 129 provided on the top surface 118*b* of the strap 118*b* to substantially impede movement of the strap 118 in one direction in the slot 170. Thus, in this embodiment 100, while a frictional engagement may still be provided in a variety of fashions as described above, the pawl member 194 may provide a mechanical engagement with the strap 118.

A mechanical strap engagement is provided within the front strap slot 172, which includes a top opening 172*a* and a bottom opening 172*b*. That is, not only may there by frictional engagement, but there is a locking mechanical engagement that occurs to prevent motion of the strap 118 within the slot 172, at least in one direction. The mechanical engagement is preferably provided by a toothed pawl 186 coupled to the front sidewall 152 by a living hinge 188. The pawl 186 may cooperate with the bunton 184 to pinch the strap 118 therebetween after the strap 118 has been inserted into the top opening 172*a* and the pawl 186 has become engaged with one or more of the engagement teeth 129 provided on the top surface 118*b* of the strap 118. Also preferably provided in the front strap slot 172 are one or more strap feeding rails 190, which serve to guide the first end 102 outward from the head 150 in a convenient manner to be grasped by a human hand or a bundle tie tensioning tool (cable tie tension and cut off tool).

Figure 1:
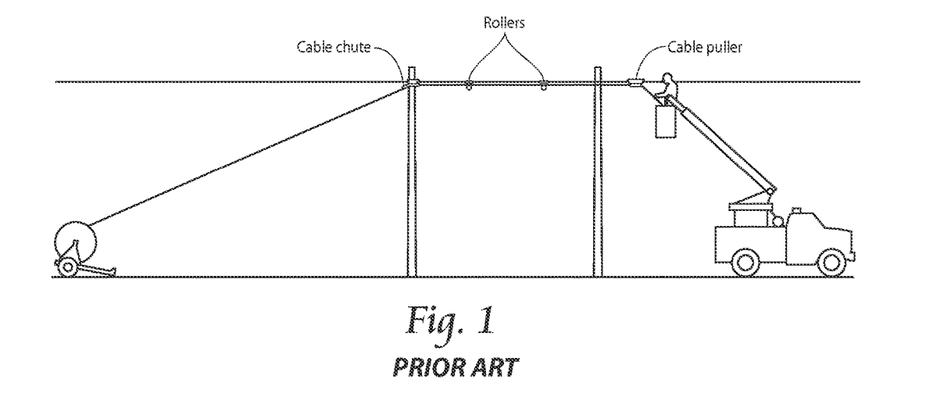
FIG. 1 is a diagrammatic view of the aerial back pull method of installing coaxial cable.
Figure 2:
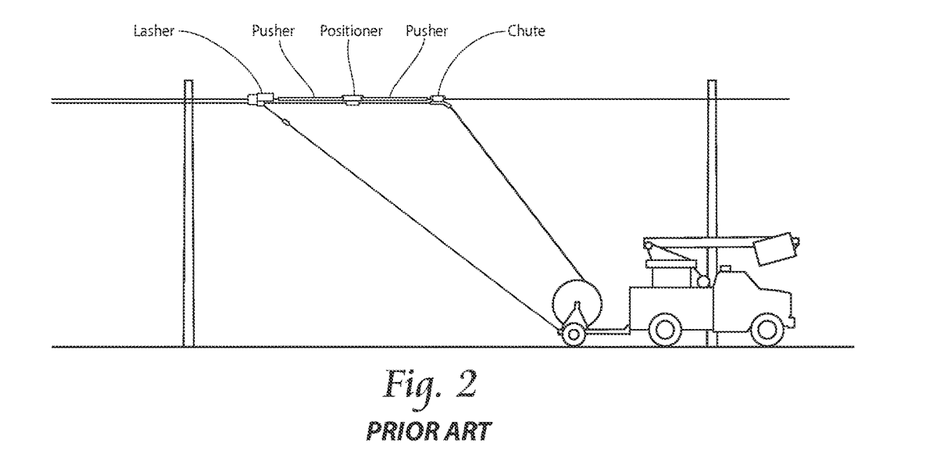
FIG. 2 is a diagrammatic view of the drive off method of installing coaxial cable.
Figure 3:
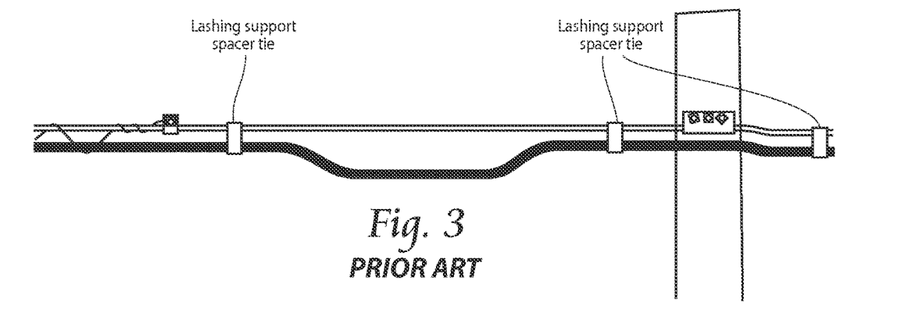
FIG. 3 is a diagrammatic view of the components utilized in installing coaxial cable on an aerial support wire including the lashing support spacer tie of the present invention.
Figure 4:
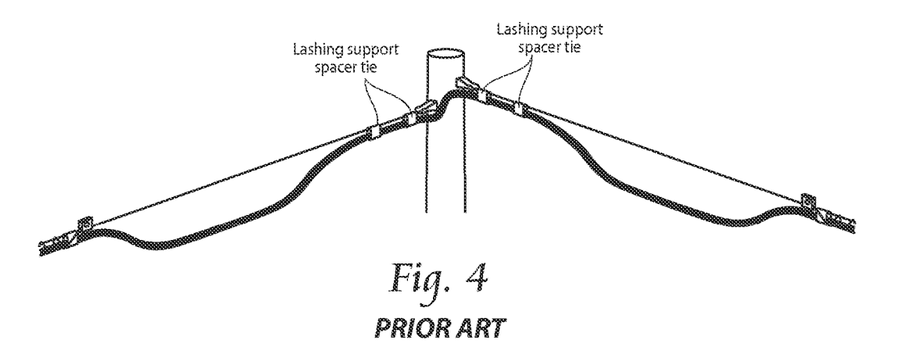
FIG. 4 is a diagrammatic view of the components utilized in installing coaxial cable on an aerial support cable with bends installed on the coaxial cable.
Figure 5:
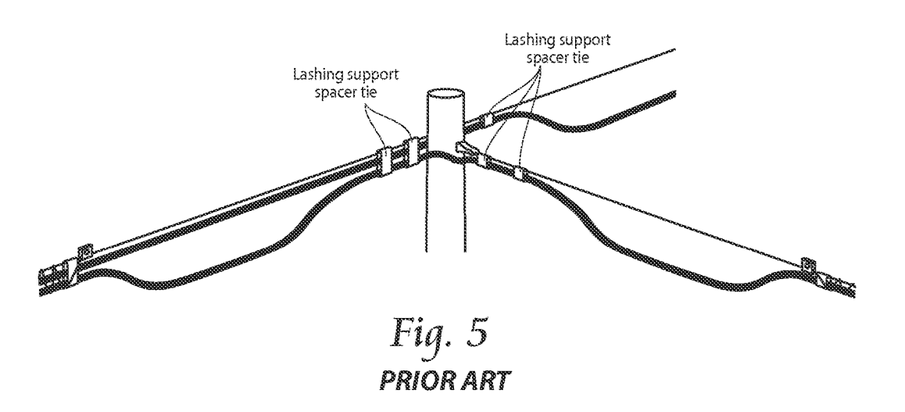
FIG. 5 is a diagrammatic view of the components utilized in installing multiple coaxial cables on aerial support cable.
Figure 6:
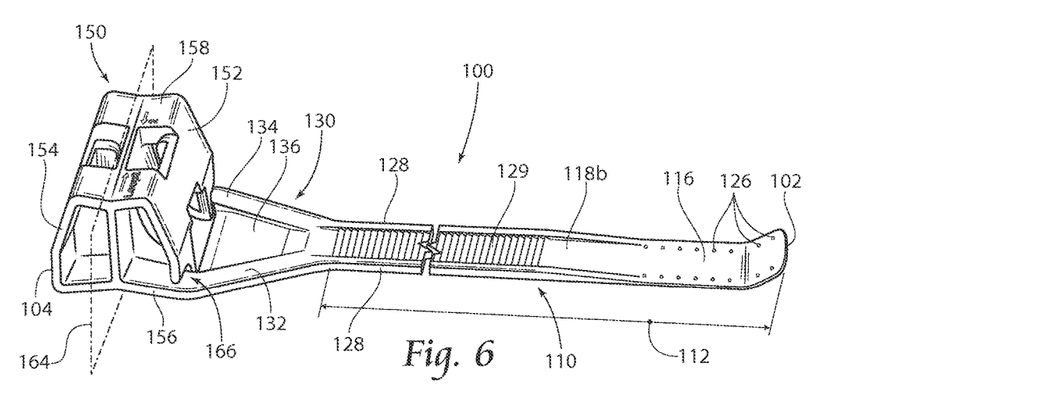
FIG. 6 is a perspective view of a first embodiment of the lashing support spacer tie according to the present invention.
Figure 7:
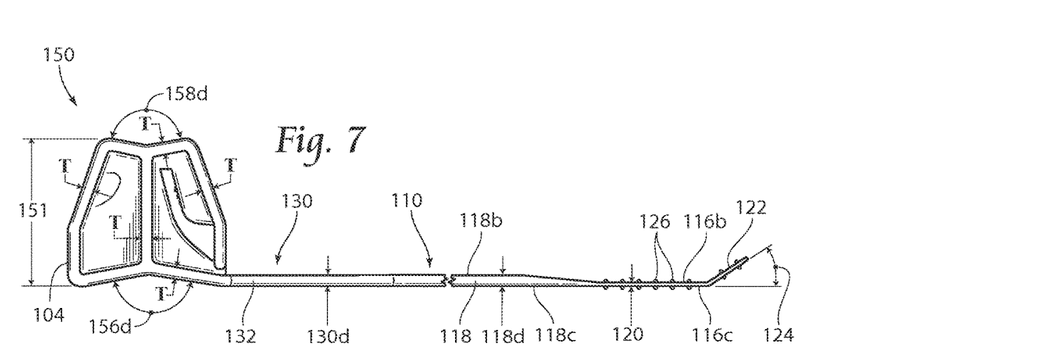
FIG. 7 is a left side elevation view of the embodiment of FIG. 6.
Figure 8:
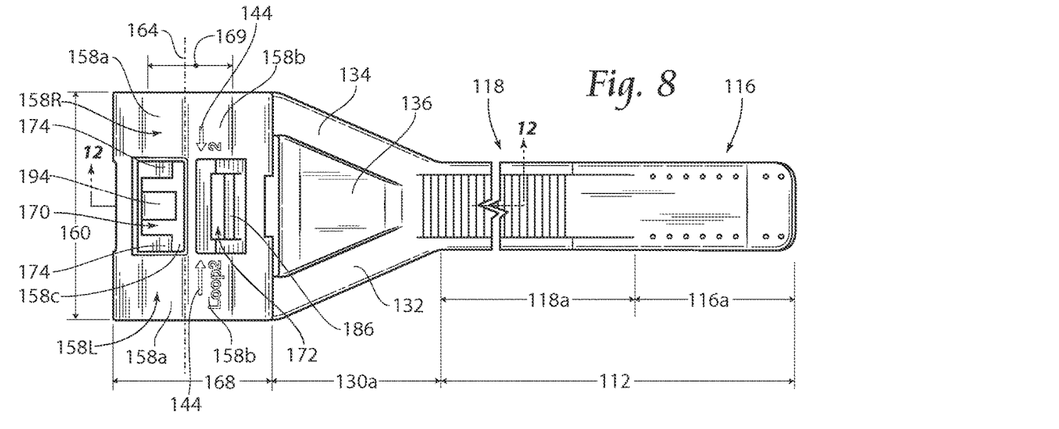
FIG. 8 is a top plan view of the embodiment of FIG. 6.
Figures 13, 14, 15:
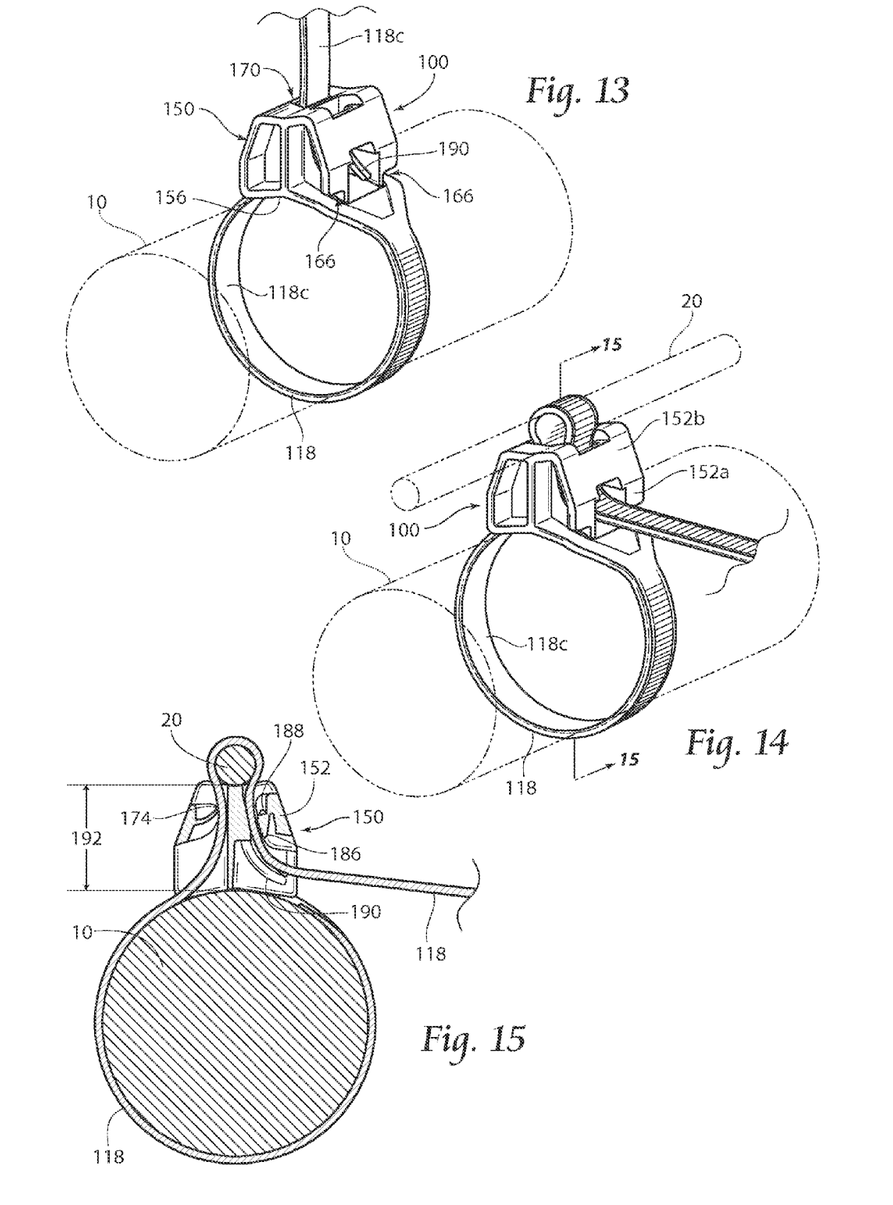
FIG. 13 is a perspective view of the embodiment of FIG. 1 in a first encircled bundle position.
FIG. 14 is a perspective view of the embodiment of FIG. 6 in a second encircled bundle position.
FIG. 15 is a cross-sectional view taken along line 15-15 of FIG. 14.
Figure 16:
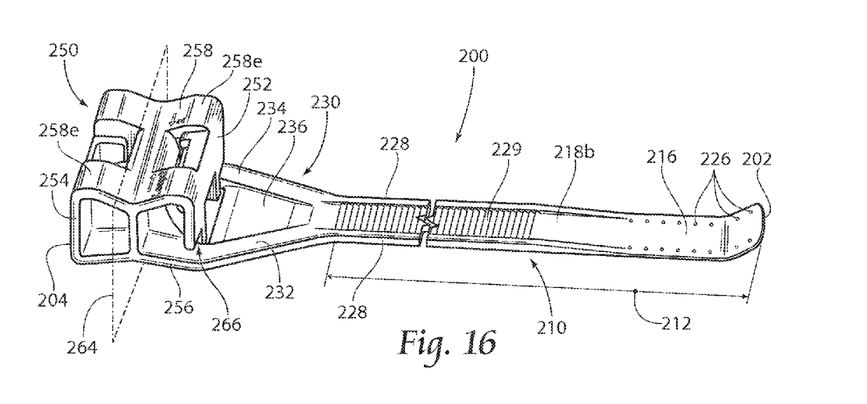
FIG. 16 is a perspective view of a second embodiment of a lashing support spacer tie according to the present invention.
Figure 17:
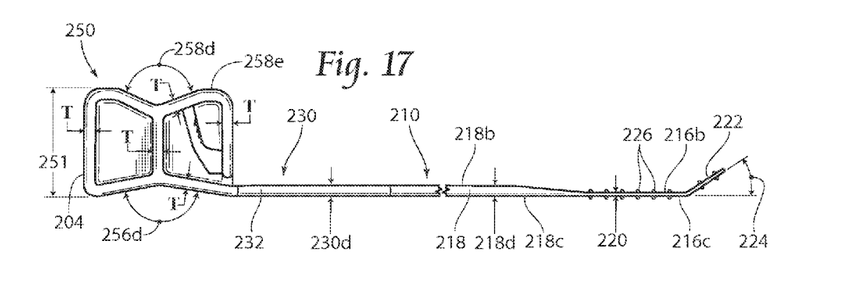
FIG. 17 is a left side elevation view of the embodiment of FIG. 16.

Turning now to FIGS. 13-15, the embodiment 100 may be seen in use. In FIG. 8, the bottom sidewall 156 of the head 150 has been placed against an elongate article or bundle of articles 10 (shown in phantom for ease of illustration) and the strap 118 has been inserted through the rear strap slot 170 and held in the slot 170 through frictional engagement as described above. Additionally or alternatively, the strap 118 may be inserted through the slot 170 prior to being placed around the elongate article 10. Regardless, the frictional engagement provided in the slot 170 on the strap 118 may be advantageous for temporary positioning of the tie 100, as the engagement is preferably completely reversible, simply by pulling the head 150 away from the article 10, or pulling on the strap 118 along its length 112 with sufficient release force. When the strap 118 is engaged in any of the three mentioned frictional engagements it is preferable that the release force required to release the strap 118 from such engagement is greater than any longitudinal force that may be exerted by the spring force of the strap 118, itself, such that the strap 118 remains frictionally engaged after placement about an elongate object 10. Such continued frictional engagement may provide a positionable circumferentially or longitudinally slidable engagement, as further described below.

Figure 9:
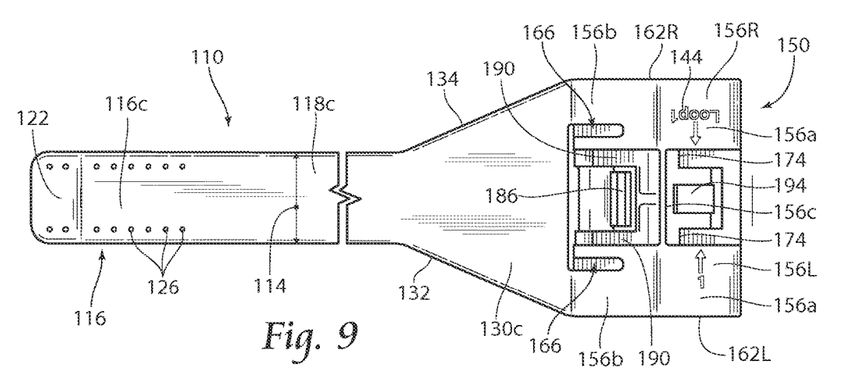
FIG. 9 is a bottom plan view of the embodiment of FIG. 6.
Figure 10:
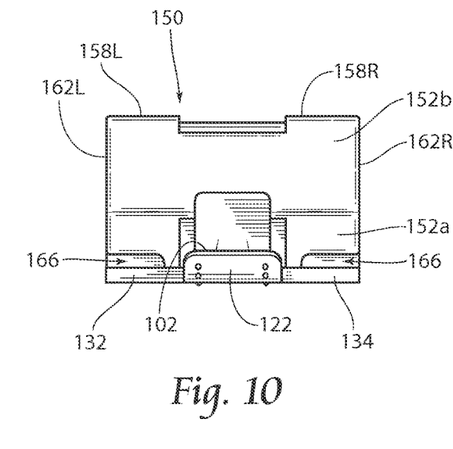
FIG. 10 is a front elevation view of the embodiment of FIG. 6.
Figure 11:
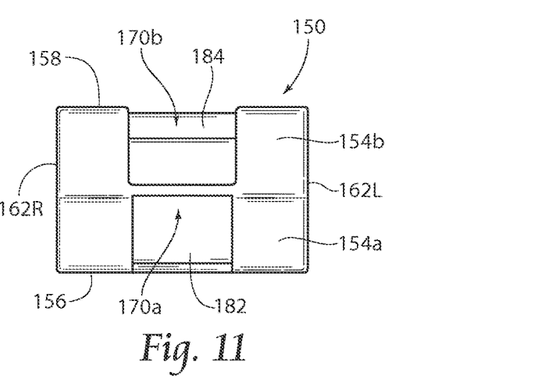
FIG. 11 is a rear elevation view of the embodiment of FIG. 6.

Once a support structure, such as a suspended cable 20, is identified and the tie 100 or several ties 100 have been positioned about one or more elongate objects 10 and the strap 18 is frictionally engaged within the rear strap slot 170, the strap 118 can be positioned about the support structure 20 and through the front strap slot 172 and mechanically engaged therein by the pawl 186 cooperating with the bunton 184, as shown in FIGS. 9 and 10. In this fashion, the top sidewall 158 of the head 150 is drawn into secure abutment with the support structure 20 as the strap 118 is pulled further through the front strap slot 172. Once a desired securement has been attained, the elongate article 10 will be spaced from the support structure 20 by a spacer height 192, and the strap 118 may be severed near the outside of the head 150, proximate the front sidewall 152, to remove any undesirable length thereof.

Turning now to FIGS. 16-22, a second embodiment 200 of a bundle tie according to the present invention is shown, where similar reference numerals refer to similar or identical structure when compared to the first embodiment 100, and the description above should be referenced with respect thereto, unless contradictory description is provided below. In this embodiment 200, however, there are a few differences from the first embodiment, namely front and rear sidewall profile shapes, additional top sidewall coplanar sections, and a mechanical engagement member disposed within the rear strap slot.

With respect to front and rear sidewall profiles of this second embodiment 200, the front sidewall 252 and the rear sidewall 254 are preferably provided as substantially planar sidewalls extending parallel to the head medial plane 264. With respect to the top sidewall 258 of this embodiment 200, the top sidewall 258 is provided with a pair of third coplanar wall sections 258*e* disposed on opposite sides of the head medial plane and joining a respective first coplanar wall section 258*a* and the rear sidewall 254, and second coplanar wall section 258*b* and the front sidewall 252. The third coplanar sections 258*e* are preferably disposed at least substantially perpendicular to the head medial plane 264.

Figure 22:
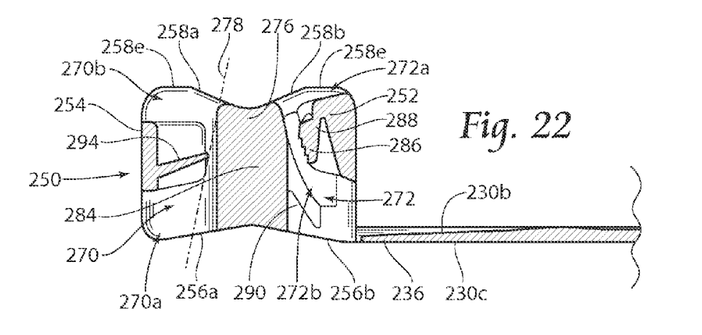
FIG. 22 is a cross-sectional view taken along line 22-22 of FIG. 18.

Regarding the mechanical engagement member in the rear strap slot 270, a pawl member 294 extends into the slot 270 towards the head medial plane 264, depending from the rear sidewall 254. The pawl member 294 is adapted to engage one or more of the teeth 229 provided on the top surface 218*b* of the strap 218*b* to substantially impede movement of the strap 218 in one direction in the slot 270. Thus, in this embodiment 200, while a frictional engagement may still be provided in a variety of fashions as described above (such as along a friction line 278), the pawl member 294 may provide a mechanical (or higher frictional) engagement with the strap 218.

Figure 18:
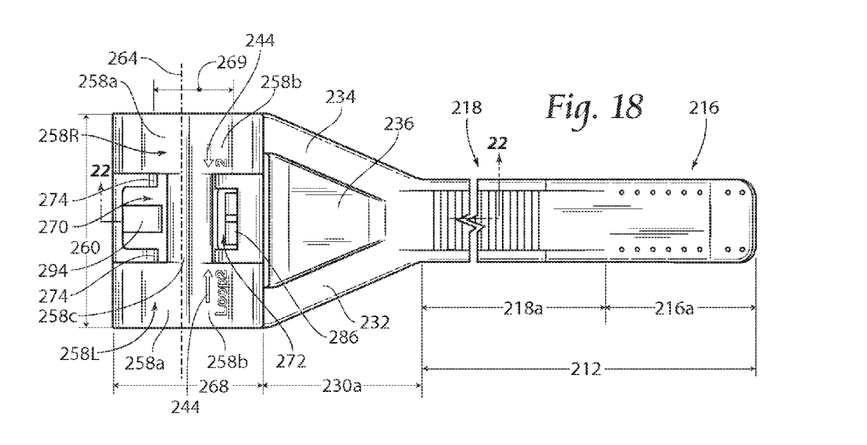
FIG. 18 is a top plan view of the embodiment of FIG. 16.
Figure 19:
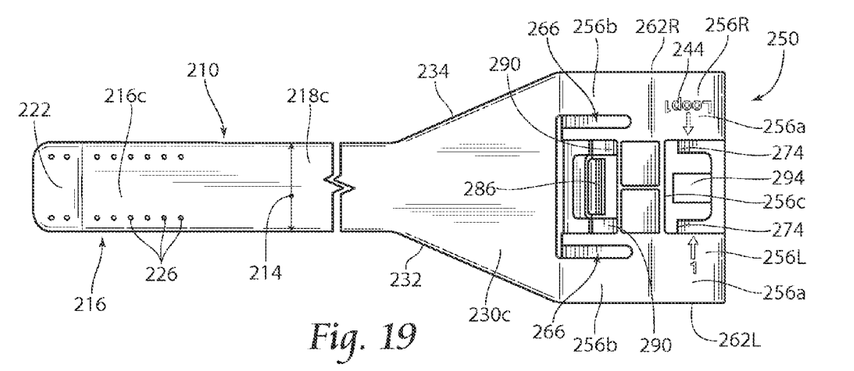
FIG. 19 is a bottom plan view of the embodiment of FIG. 16.
Figure 20:
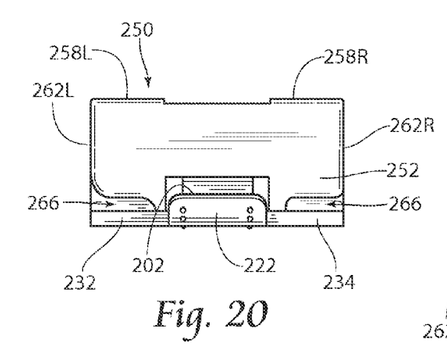
FIG. 20 is a front elevation view of the embodiment of FIG. 16.
Figure 21:
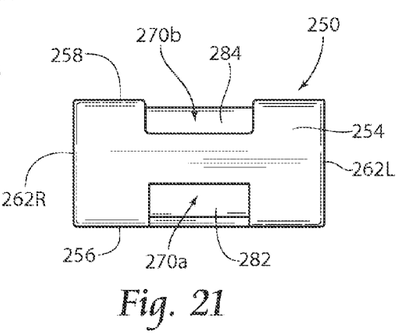
FIG. 21 is a rear elevation view of the embodiment of FIG. 16.
Figures 23, 24, 25:
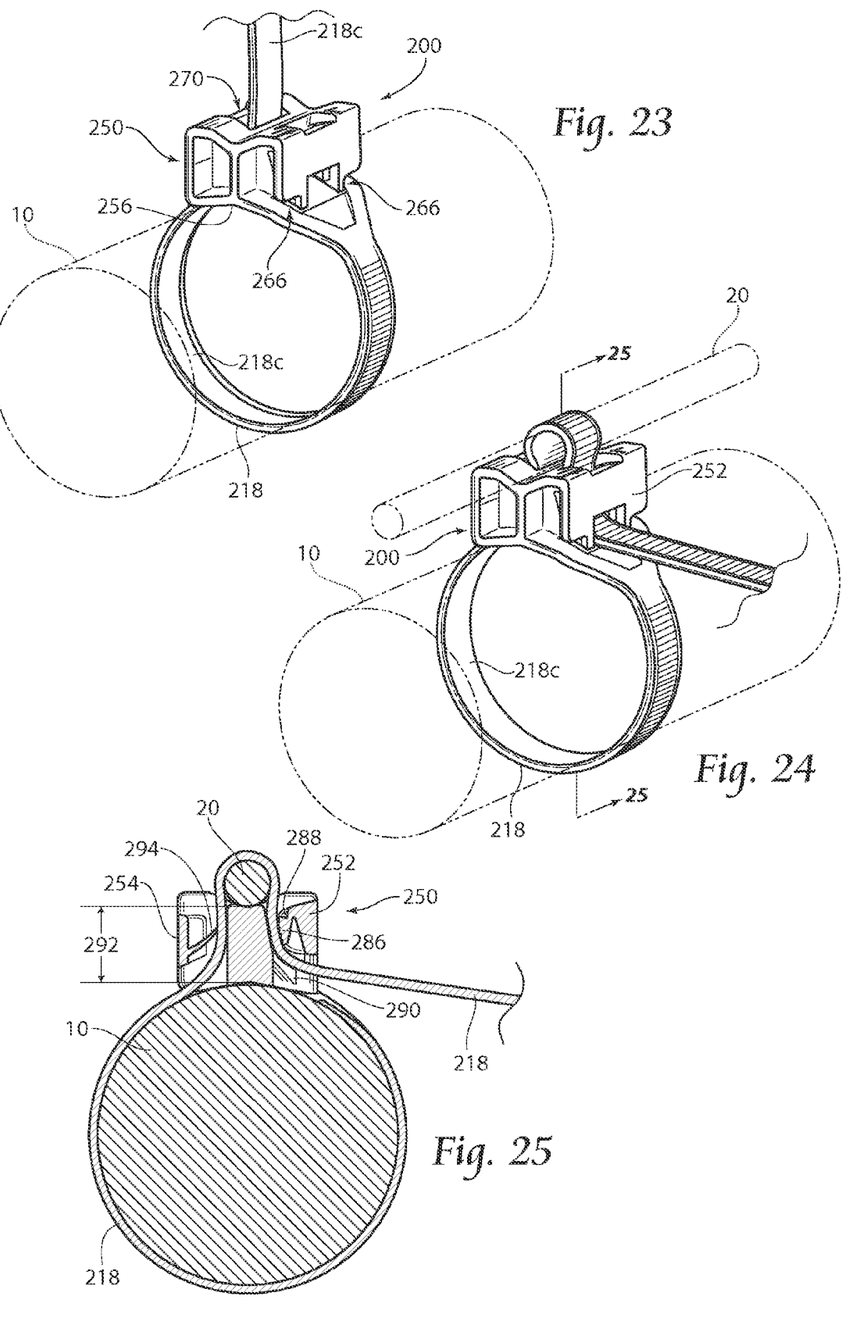
FIG. 23 is a perspective view of the embodiment of FIG. 16 in a first encircled bundle position.
FIG. 24 is a perspective view of the embodiment of FIG. 16 in a second encircled bundle position.
FIG. 25 is a cross-sectional view taken along line 25-25 of FIG. 24.

As can be seen in FIGS. 23-25, when the strap 218 is inserted into the rear strap slot 270, it is mechanically engaged by the pawl member 294 therein. In FIG. 18, the strap 218 has been so engaged, and it may be tightened to a preferred tension about the elongate article 10. The preferred tension may statically hold the strap 218 about the article 10, may maintain a positionable, circumferentially or longitudinally slidable engagement between the strap 218 and article 10, or may maintain the strap 218 in a loose loop about the article 10. It is to be understood that the positionable slidable engagement and loose loop are to be distinguished as follows: if the strap 218 is placed about the article 10 and the article 10 is positioned longitudinally vertically, the strap 218 will maintain its position on the article 10 in the positionable slidable engagement, whereas in the loose loop arrangement, the strap 218 would slide freely along the article 10 simply by the force of gravity.

AS best shown in FIGS. 8 and 9 and FIGS. 18 and 19 (as well as FIGS. 6 and 16), indicia 144 and 244 are provided to direct the user as to the order of strap 100 insertion into spacer head 150. This eliminates the need for the user to consult with written instructions or to engage in trial and error installation techniques.

Embodiments of devices according to the present invention are preferably formed as unitary members that are injection molded or otherwise molded from a desirable material, such as a plastic material. As a unitary member, the devices provide easier installation than prior devices, allowing a sole person to temporarily place the device about an elongate article (e.g. with two hands) and then elevate and support the elongate article with one hand while finalizing installation on, coupling to, or support on a support structure (e.g. an aerially supported cable) with the other hand. Integral double "V" saddle structures with a strap emanating in an outward projection provided the single part unitary construction and the "snowman" shape, strap routing profile, thereby circumferentially securing (compressing) the bundles against the double "V" saddles.

The cable routing direction allows for pulling downward on the strap for the final loop securing of the lashing support spacer tie. This is more ergonomic (pulling with gravity) Bundles are secured within the centerline of the saddle structure by means of bifurcated strap that is attached near the midpoint bottom of the saddle.

When small bundle diameters are secured, in the lower saddle, the bifurcated strap section pulls away from the lower saddle and provides tight circumferential secure bundling of the coaxial cable (or other wiring or elongate items), self-centering of the bundle against the saddle (pulls the bundle into the "V" notch saddle which in turn is aligned with the supporting support cable above).

Further, the bifurcated "Y" section adjusts to larger diameter coaxial cables (or other wiring or elongate items) and the bundle will remain centered in the "V" notch saddle. The bifurcated strap thickness is reduced at the inside "Y" section which provides clearance for the strap tail exit. The reduced bifurcated "Y" section provides an unrestricted area to deflect the strap tail, into the installers grasp, for ease of strap pull through. The reduced bifurcated "Y" section deflects the strap tail, into the installers grasp, for blind installations (overhead installation or above Installers eyes). The reduced bifurcated "Y" section maintains flexibility to enable circumferentially securing smaller bundle diameters. The bifurcated strap "Y" section contains an opening in the upper "Y" section, = yet is designed to maintain the same strength as the single strap section. The opening is required to allow molding of internal pawl. The opening also allows the bifurcated "Y" section to flex downward to adjust to small bundle diameters.

The reverse bent tail with conic grips, to direct the strap tail, upon exit, to deflect upward—away from the bundle—into the installers grasp, for ease of strap pull through.

The wide flange around the saddle perimeter provides broad surface contact against the bundle. This reduces compression of softer bundles, protects bundles from chafing, and provides more lateral/longitudinal support.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention.

We claim:

1. A one-piece lashing support spacer tie for securing a first elongate object to a second elongate object, said tie comprising:
   an elongated strap having a row of teeth disposed on one longitudinal surface and arranged transversely with respect thereto,
   a head joined to a first end of the elongated strap and having a first wall, a second, opposed wall, a first strap slot, a second strap slot, and a third wall intermediate the first and second strap slots and extending from the first wall to the second wall, wherein the first wall and the second wall are arranged to support the first and second elongate objects respectively in coplanar centered alignment with the third wall; and
   a first pawl opposite the third wall and axed within the second strap slot wherein said elongated strap is deformable in a first loop about the first elongate object as the elongated strap passes through said first strap slot and is deformable in a second loop about the second elongate object and m the elongated strap passes through said second strap slot and wherein said teeth engage said first pawl within the second strap slot;
   wherein the elongated strap has a second strap end bent relative to the one longitudinal surface;
   wherein the head further comprises fourth wall opposite the third wall and extending from the first wall to the second wall, said fourth wall defining an exit opening through which the second strap end exists the head ater engagement of the teeth with the first pawl.

2. The lashing support spacer tie of claim 1, wherein the first wall includes a first wall surface.

3. The lashing support spacer tie of claim 2, wherein the first wall surface is substantially "V" shaped.

4. The lashing support spacer tie of claim 1, wherein the second wall includes a second wall surface.

5. The lashing support spacer tie of claim 4, wherein the second wall surface is substantially "V" shaped.

6. The lashing support spacer tie of claim 1, wherein a second pawl is affixed within the first strap slot.

7. The lashing support spacer tie of claim 1, wherein the elongated strap has a second strap end and wherein a plurality of gripping elements are formed on the second strap end.

8. The lashing support spacer tie of claim 1, wherein the elongated strap is contiguous with the first wall.

9. The lashing support spacer tie of claim 8, wherein a yoke having a first arm and second arm is formed between the head and the elongated strap and wherein a web extends between the first and second yoke arms having a thickness that is thinner than either of the first and second yoke arms, whereby the elongated strap is deflected outwardly from the second strap slot for securement about the first and second elongate objects.

10. The lashing support spacer tie of claim 9, wherein a flexion gap is formed between the head and the elongated strap.

11. The lashing support spacer tie of claim 1, wherein the third wall defines an arcuate strap feeding rail configured to guide the second strap end through the exit opening.

12. A one-piece lashing support spacer tie for securing a first elongate object to a second elongate object, said tie comprising:
an elongated strap having a row of teeth disposed on one longitudinal surface and arranged transversely with respect thereto,
a head joined to a first end of the elongated strap and having a first wall, a second wall, a first strap slot, a second strap slot, and a third wall intermediate first and second strap slots and extending from the first wall to the second wall, wherein the first wall and the second wall are arranged to support the first and second elongate objects respectively in coplanar centered alignment with the third wall;
a first pawl opposite the third wall and affixed within the first strap slot;
a second pawl opposite the third wall and affixed within the second strap slot; and wherein said elongated strap is deformable in a first loop about the first elongate object, passes through said first strap slot wherein said teeth engage with said first pawl, is deformable in a second loop about the second elongate object and passes through said second strap slot wherein said teeth engage with said second pawl
wherein the elongated strap has a second strap end bent relative to the one longitudinal surface;
wherein the head further comprises fourth wall opposite the third wall and extending from the first wall to the second wall, said fourth wall defining an exit opening through which the second strap end exists the head alter engagement of the teeth with the first pawl.

13. The lashing support spacer tie of claim 1, wherein the elongated strap, head, and first pawl are integrally formed.

14. The lashing support spacer tie of claim 12, wherein the third wall defines an arcuate strap feeding rail configured to guide the second strap end through the exit opening.

15. The lashing support spacer tie of claim 11, wherein the first wall has a substantially "V" shaped cross section.

16. The lashing support spacer tie of claim 12, wherein the second wall has a substantially "V" shaped cross section.

17. The lashing support spacer tie of claim 12, wherein strap insertion indicia are included on one of the first and second walls.

18. The lashing support spacer tie of claim 12, wherein strap insertion indicia are included on the first and second walls.

19. The lashing support spacer tie of claim 12, wherein the elongated strap slideably engages the first pawl.

20. The lashing support spacer tie of claim 12, wherein the elongated strap has a second strap end and a plurality of gripping elements are fanned on the second strap end.

21. The lashing support spacer tie of claim 15, wherein the elongated strap is contiguous with the first wall.

22. The lashing support spacer tie of claim 21, wherein a yoke having a first arm and second arm is formed between the head and the elongated strap, wherein a web extends between the first and second yoke arms having a thickness that is thinner than either of the first and second yoke arms, whereby the elongated strap is deflected outwardly from the second strap slot for securement about the first and second elongate objects.

23. The lashing support spacer tie of claim 22, wherein a flexion gap is formed between the head and the elongated strap.

24. The lashing support spacer tie of claim 12, wherein the elongated strap, head, first pawl, and second pawl are integrally formed.

* * * * *